United States Patent [19]

Olson

[11] Patent Number: 5,286,462
[45] Date of Patent: Feb. 15, 1994

[54] GAS GENERATOR SYSTEM FOR UNDERWATER BUOYANCY

[75] Inventor: Jonathan E. Olson, Fort Wayne, Ind.

[73] Assignee: Magnavox Electronic Systems Company, Fort Wayne, Ind.

[21] Appl. No.: 947,608

[22] Filed: Sep. 21, 1992

[51] Int. Cl.[5] .............................................. B01J 7/00
[52] U.S. Cl. ................................... 422/305; 422/120; 422/122; 422/163; 48/61; 114/54
[58] Field of Search ............... 422/120, 122, 164, 165, 422/305; 48/61; 114/54; 441/9, 98

[56] References Cited

U.S. PATENT DOCUMENTS

| | | | |
|---|---|---|---|
| 2,412,205 | 12/1946 | Cook | 114/54 |
| 2,558,756 | 7/1951 | Jackson et al. | 422/165 |
| 2,569,977 | 10/1951 | Dickinson | 441/9 |
| 2,816,419 | 12/1957 | Mueller | 422/164 |
| 3,618,976 | 11/1971 | Leising et al. | 422/165 |
| 3,777,692 | 12/1973 | Baccaglini et al. | 114/54 |
| 3,820,956 | 6/1974 | Titterington et al. | 441/98 |
| 4,230,667 | 10/1980 | Williams | 422/120 |
| 4,342,725 | 8/1982 | Collins | 422/120 |
| 4,595,564 | 6/1986 | Spector et al. | 422/305 |
| 4,981,655 | 1/1991 | Kolbe et al. | 422/305 |

Primary Examiner—Robert J. Warden
Assistant Examiner—Hien Tran
Attorney, Agent, or Firm—John H. Crozier; Richard T. Seeger

[57] ABSTRACT

In a preferred embodiment, a gas generator system for providing underwater buoyancy, including: a housing for the placement therein of a solid chemical to produce a gas upon reaction of the chemical with water; an inlet in the housing to bring the water in contact with the chemical; a float attached to an upper portion of the housing to receive the gas and thereby to become inflated so as to effect the buoyancy; a pressure plate to continually bear against the upper surface of the chemical as the chemical is consumed by the reaction, the pressure plate having defined therethrough a plurality of apertures, the total area of the apertures being selected so as to control the rate of reaction of the chemical and being spaced so as to permit even distribution of water to the surface of the chemical; and a biaser to cause the pressure plate to continually bear against the upper surface of the chemical as the chemical is consumed.

19 Claims, 10 Drawing Sheets

GAS GENERATOR SYSTEM FOR UNDERWATER BUOYANCY

BACKGROUND OF THE INVENTION

1. Field of the Invention

The present invention relates to devices for providing underwater buoyancy generally and, more particularly, but not by way of limitation, to a novel gas generator especially useful for providing buoyancy in deep water.

2. Background Art.

A need exists for jettisoning a device to the surface of a body of water within some period of time after deployment from a submarine or after descension from the surface of the water.

One approach to this is to discharge compressed gas into a volume. However, there are several problems with utilizing compressed gas for deep water buoyancy. These include the pressure of the stored gas, the container size required to hold the necessary volume, and mechanical activation and volume discharge control. To expel gas at depth, the internal pressure of the storage device must be significantly greater than the ambient water pressure. There must be a release mechanism that must be triggered from some external source. When the compressed gas is released, it either must be flow limited or the float assembly must be capable of releasing any excess at a flow rate consistent with the gas discharge rate from the container. Without flow limiting, it may be difficult to deploy an initially packaged float. The gas discharge rate needs to be variable as a function of ambient pressure, i.e., a greater flow rate is required at higher ambient pressures and a lesser flow rate is required at lower ambient pressures. Though the provision of variable flow rate is possible, it entails a relatively large and complex system.

Explosive gas generators also do not lend themselves well to this kind of application. The volume of gas generated, the pressure of the gas, and the size of the individual devices are within the requirements for deep water buoyancy, but there are major problems. These include safety, the speed of gas generation, activation from an electric source, and shelf life limitations. As indicated by its name, the gas is generated in an explosive burst. As with any explosive device, special safety handling requirements are necessary to avoid hazards to personnel and equipment. When activated, the gas is under very high pressure for a very short time. It would be difficult, if not impossible, to contain this gas in a packaged float assembly. Activation requires a pulse of electricity. This electricity must come from some energy storage device and be activated through a control circuit. These peripherals add expense and complexity. Most all explosive gas generators have a limited shelf life. This would not be acceptable in a unit that may sit idle for a long period of time prior to its required activation.

There a number of propulsion devices that could be employed, among them propeller drives, turbine water drives, and gas jet propulsion. They all have the same major drawbacks. They tend to be expensive, they utilize power from some source (electrical, thermal, etc.) and they require control means. The control means requires some level of complexity in order for the device to steer the unit to the surface via the most direct route. This entails the use of control circuitry with mechanically actuated control surfaces and may require some method of determining what is vertical. Using this technique to jettison a unit to the surface of a body of water would not be cost effective in most applications.

Chemical gas generation overcomes most of the foregoing problems. However, most chemicals that react with water do not generate gas quickly enough for this application. Two examples of chemicals that do are lithium hydride and calcium hydride. With both of these chemicals, there is a significant problem of containing the reaction so that it does not approach that of an explosive condition. This would generally entail the metering of the water to the chemical or vice versa. The problem with metering is that a mechanical device must be employed that will keep the chemical dry until it is required to be mixed with the water. An apparatus developed for this function may require significant complexity. Another potential problem is the heat generated by the reaction which may limit the possibility of material usage unless a cooling scheme is utilized to limit the heat build up within the device.

Accordingly, it is a principal object of the present invention to provide a gas generator system for underwater buoyancy that overcomes the limitations of prior devices and that provides for deployment at any depth from surface to maximum depth.

It is a further object of the invention to provide such a generator that does not require power from an external source for gas generation.

It is an additional object of the invention to provide such a generator that is of minimum size and weight.

It is another object of the invention to provide such a generator that has relatively inexpensive material usage.

A further object of the invention to provide such a generator that is relatively inexpensive to manufacture.

An additional object of the invention is to provide such a generator that does not cause any undue hazard to personnel or equipment.

Another object of the invention is to provide such a generator that provides for the selection of the rate of gas generation.

Yet a further object of the invention is to provide such a generator that permits escape of excess gas due to expansion caused by pressure variation or by excess generation.

Yet an additional object of the invention is to provide such a generator that has a very long shelf life.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing in a preferred embodiment, a gas generator system for providing underwater buoyancy, comprising: a housing for the placement therein of a solid chemical to produce a gas upon reaction of said chemical with water; inlet means in said housing to bring said water in contact with said chemical; float means attached to an upper portion of said housing to receive said gas and thereby to become inflated so as to effect said buoyancy; a pressure plate to continually bear against the upper surface of said chemical as said chemical is consumed by said reaction, said pressure plate having defined therethrough a plurality of apertures, the total area of said apertures being selected so as to control the rate of reaction of said chemical and being spaced so as to permit even distribution of water to the surface of said chemical; and biasing means to cause said pressure plate to continually bear against said upper surface of said chemical as said chemical is consumed.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
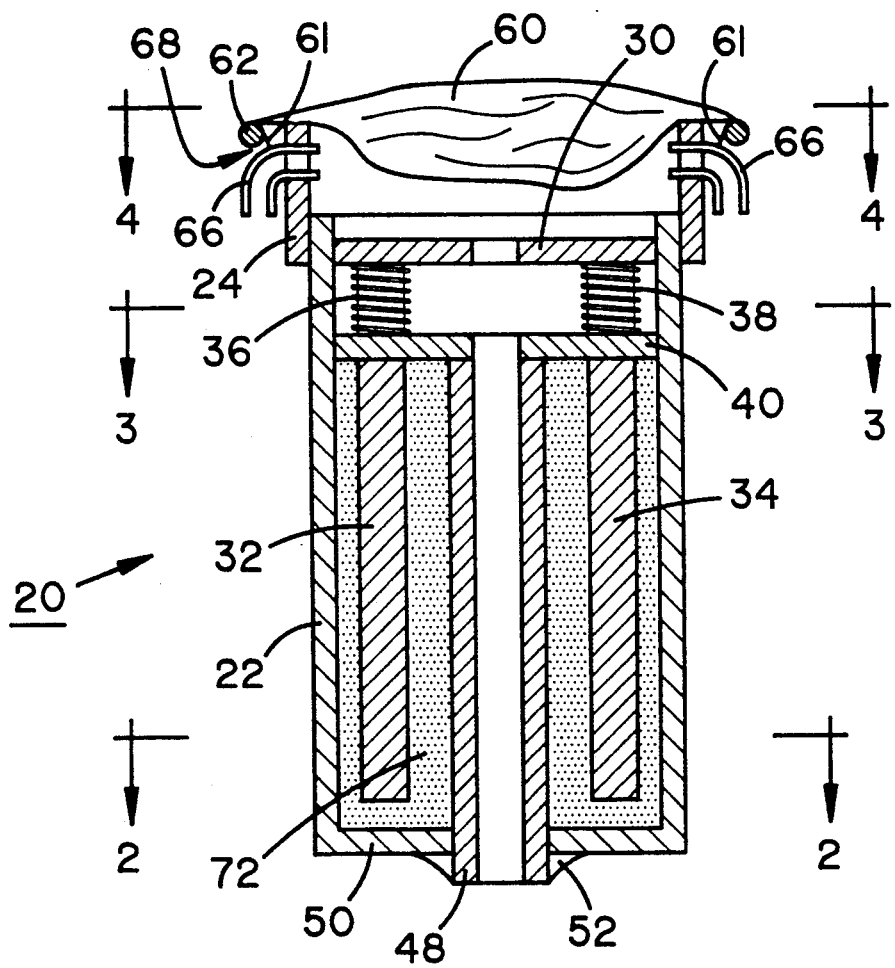
FIG. 1 is a side elevational view, in cross-section, of a gas generator system according to the present invention in its initial or deflated condition.
Figure 2:
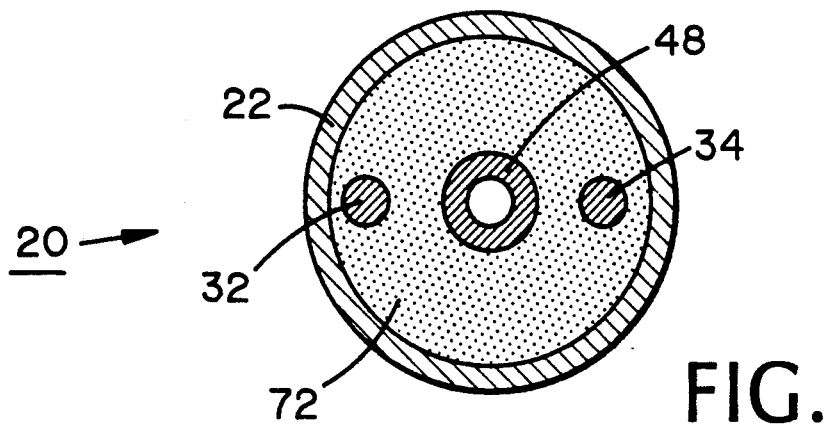
FIG. 2 is a cross-sectional view taken along line "2—2" of FIG. 1.

Reference should now be made to the drawing figures, on which similar or identical elements are given consistent identifying numerals throughout the various figures thereof, and which parenthetical references to figure numbers direct the reader to the view(s) on which the element(s) being described is (are) best seen, although the element(s) may be seen also on other views.

Referring first to FIGS. 1-4, there is illustrated a gas generator system according to the present invention, generally indicated by the reference numeral 20. System 20 includes an open top, vertical, cylindrical lower chamber 22 to which is fixedly attached at the top thereof a vertical annular upper chamber 24.

Fixedly attached to lower chamber 22 near the upper end thereof is a narrow, horizontal, spring mounting plate 30 (FIG. 4) from which depend two spring guide posts 32 and 34 upon which, in turn, are disposed, respectively, coil springs 36 and 38.

As shown on FIG. 1, a horizontal pressure plate 40, having defined therethrough a plurality of vertical apertures, as at 42 (FIGS. 3 and 4), extends across lower chamber 22 and is disposed for axial movement within the lower chamber 22 along spring guide posts 32 and 34. Fixedly attached to and extending downwardly from pressure plate 40 is an open cylindrical water inlet tube 48 (FIG. 1) which extends through the bottom 50 of lower chamber 22 in sliding relationship therewith. A seal 52 (FIG. 1) comprising a thin flexible membrane is disposed between inlet tube 48 and bottom 50 to provide a water tight closure.

A lightweight, flexible, inflatable float 60 (shown collapsed on FIG. 1) is attached by means of four flexible ties 61 (FIGS. 1 and 4) attached to four upper water vents 66 extending through the wall of upper chamber 24. Float 60 has disposed at the base thereof a rigid ring 62 which forms the bottom circular shape of the float. The compliant attachment afforded by flexible ties 61 permits ring 62 to "float" around upper chamber 24 to help absorb perturbations in the water in which system 20 is deployed.

Water vents 66 turn downwardly 90 degrees after they exit upper chamber 24. A gas vent 68 (FIGS. 1 and 4) is provided from float 60 underneath ring 62.

As shown on FIG. 1, springs 36 and 38 bias pressure plate 30 against a water reactive chemical 72 which substantially fills lower chamber 22, which chemical is preferably solid lithium hydride powder.

Figure 5:
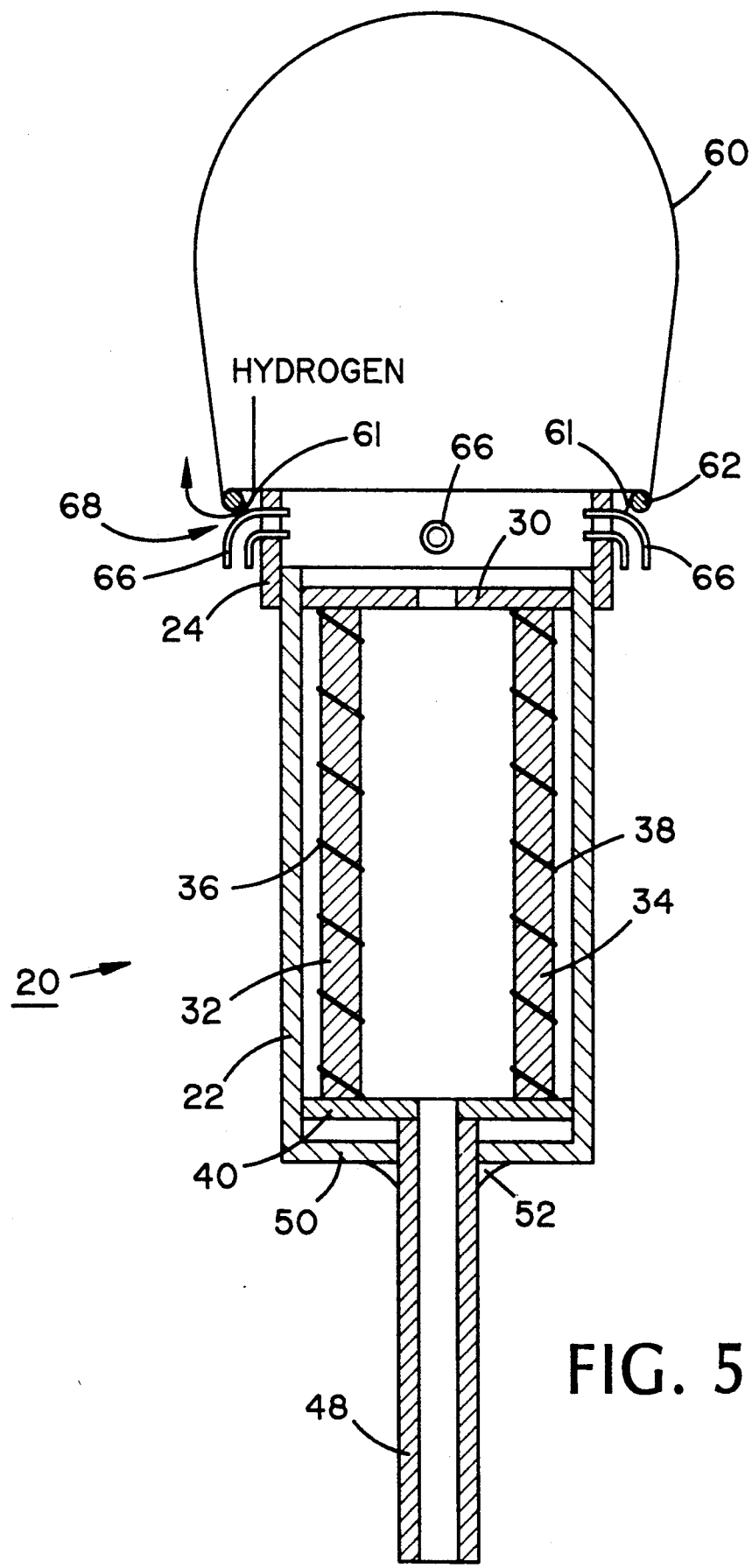
FIG. 5 is a side elevational view, in cross-section, of the gas generator in fully inflated condition.

FIG. 5 illustrates system 20 in its inflated or final condition, with float 60 fully inflated. System 20 has changed from its initial or deflated condition to its inflated condition through the generation of hydrogen via the following reaction between lithium hydride chemical 72 and the water in which the system is disposed:

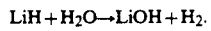

$$LiH + H_2O \rightarrow LiOH + H_2.$$

Figure 6:
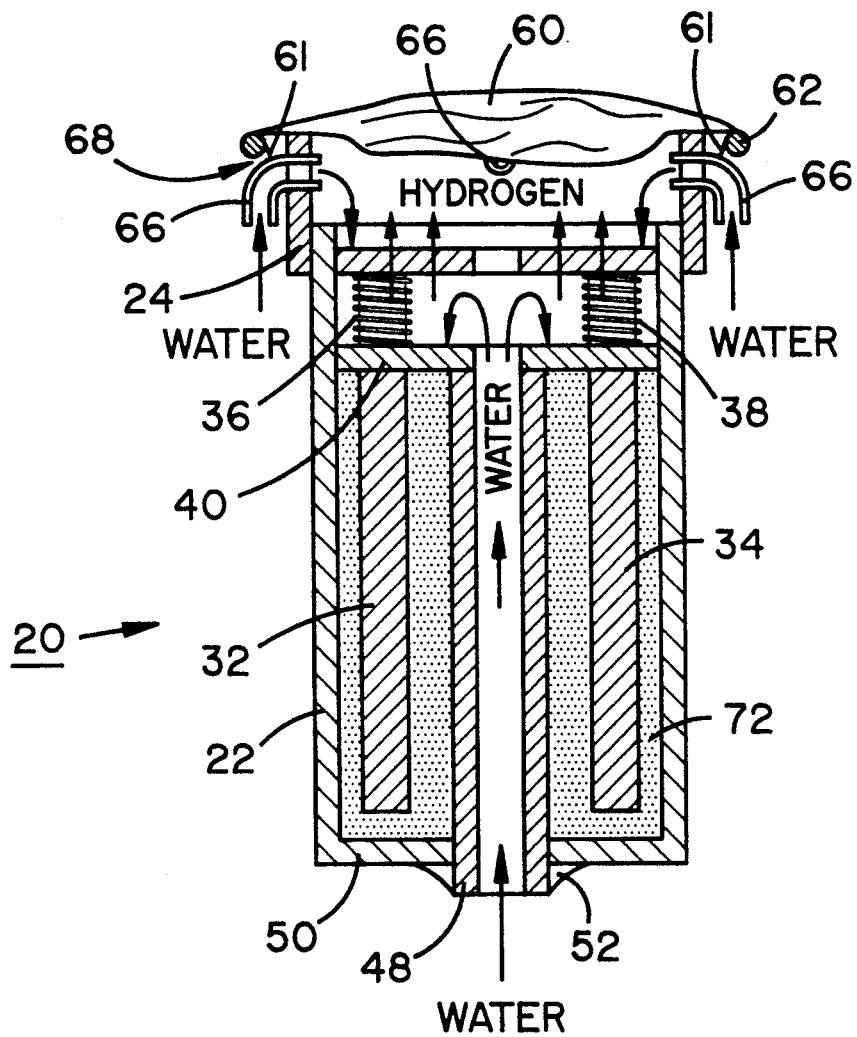
FIGS. 6 and 7 are side elevational views, in cross-section, of the gas generator illustrating the mechanism by which the gas generator system becomes inflated.
Figure 7:
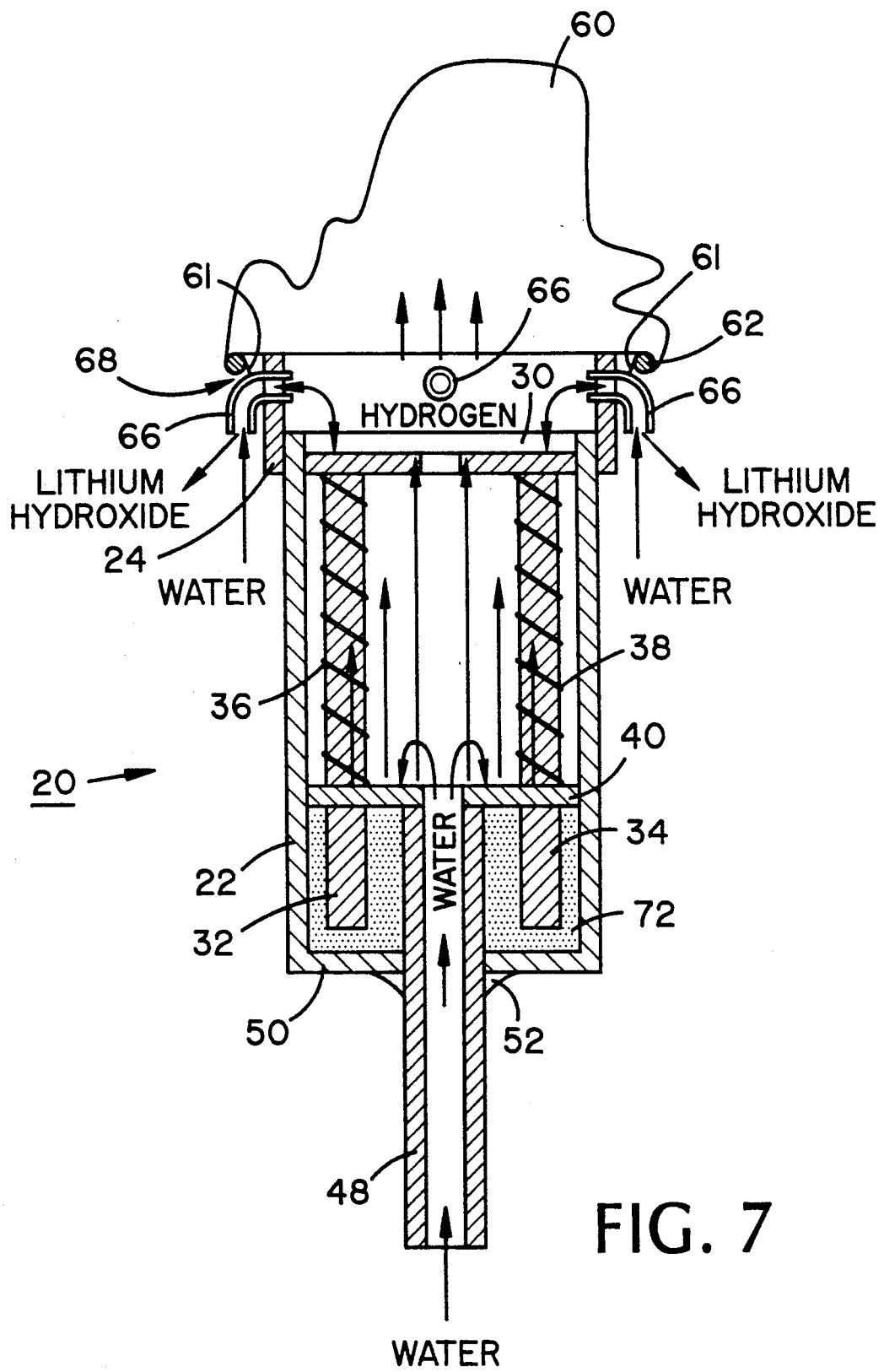

FIGS. 6 and 7 illustrate the method by which the above reaction takes place. As shown on FIG. 6, water is being allowed to enter system 20 through upper vents 66 and inlet tube 48. Entry of the water may be controlled by conventional pressure switches, purely mechanical activation means, or electrically activated mechanical means (none shown). This water flows through apertures 42 at a controlled rate and reacts at the upper surface of lithium hydride chemical 72 to produce hydrogen gas and lithium hydroxide. The hydrogen gas rises and begins to inflate float 60. As shown on FIG. 7, float 60 has become partially inflated and the consumption of chemical 72 is marked by the lowered position of pressure plate 40 as it is pressed against the remaining chemical by springs 36 and 38 as the chemical is consumed. As also shown on FIG. 7, upper vents 66 also provide an exit for the byproduct lithium hydroxide.

As shown on FIG. 5, all chemical 72 has been consumed and float 60 is fully inflated, springs 36 and 38 are fully extended, pressure plate 40 is at the lower end of lower chamber 22, inlet tube 48 is extended the maximum distance through bottom 50, and water flow through the inlet tube has ceased. Also as shown on FIG. 5, hydrogen gas can be vented through gas vent 68 as system 20 rises in the water and the hydrogen in float 60 expands or if excess hydrogen is produced.

The volume of float 60 is selected to provide the necessary buoyancy for the ascension of system 20 and the underwater package (not shown), to which it is attached, at a desired rate of ascension. The volume of chemical 72 is selected to produce enough hydrogen gas to at least fill float 60. Any excess hydrogen will be vented as noted above to prevent rupture of float 60.

The arrangement of perforated pressure plate 40 on chemical 72 controls the location of the chemical reaction. The area of symmetrically disposed apertures 42 provides primary control of the rate of reaction to limit the rate to produce a reasonable flow of hydrogen gas, but to assure that the rate is great enough to keep byproduct lithium hydroxide flushed from the surface of the reacting chemical. The movement of inlet tube 48 with respect to the location of the chemical reaction allows for water flow into the reaction sites with no possibility for stagnation (lithium hydroxide saturation). A chimney effect created by the rising hydrogen gas draws water up inlet tube 48 during initial filling and sustained operation and helps flush byproduct lithium hydroxide into upper chamber 24 so that it can exit via upper water vents 66. The arrangement of upper vents 66 permits initial water fill and subsequent exhaust of lithium hydroxide byproduct without the loss of the generated gas.

Figure 3:
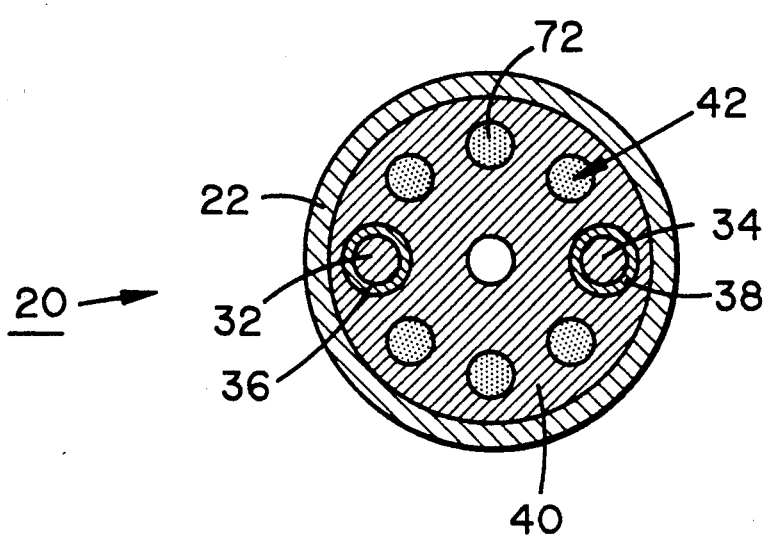
FIG. 3 is a cross-sectional view taken along line "3—3" of FIG. 1.
Figure 4:
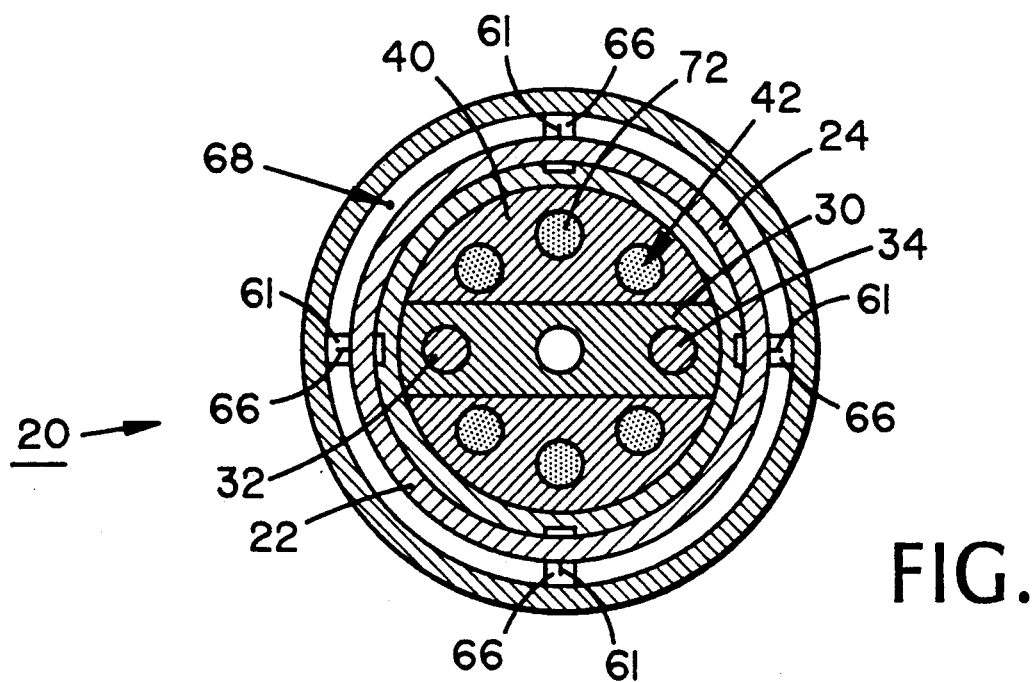
FIG. 4 is a cross-sectional view taken along line "4—4" of FIG. 1.

As shown on FIGS. 3 and 4, six apertures 42 are symmetrically disposed through pressure plate 40, with respect to guide posts 32 and 34, and have a total open area of approximately 27 percent of the area of the pressure plate.

System 20 has been found to operate satisfactorily at relatively low ambient pressures; however, it has been found that, at high ambient pressures, inlet tube 48 does not have enough chimney effect water draw to perforated plate 40, due to the compressed hydrogen gas having a significantly reduced bubble size. This causes a saturation of lithium hydroxide in lower chamber 22 and excessive heat generation. In turn, this forms a solid crust of lithium hydroxide in lower chamber 22. This crust seals chemical powder 72 from contact with the water, thus halting complete reaction of all available chemical.

Figure 8:
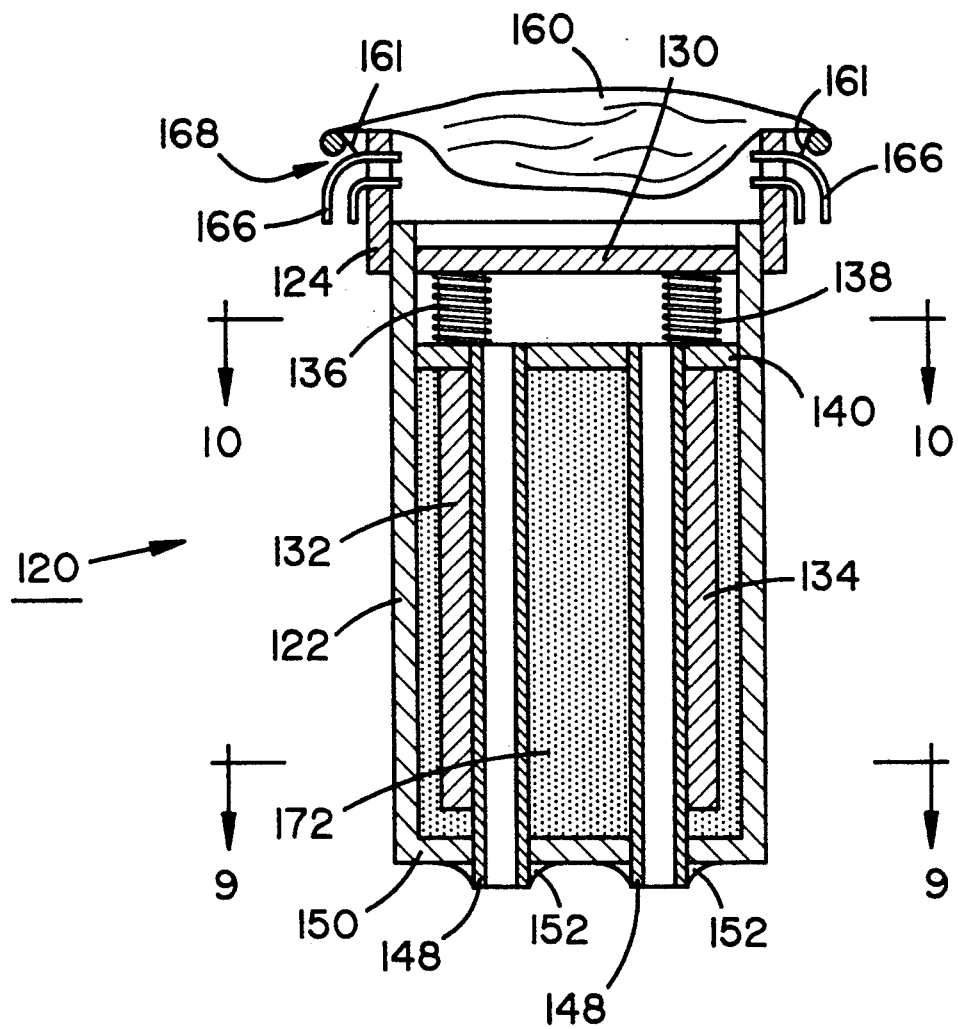
FIG. 8 is a side elevational view, in cross-section, of an alternative embodiment of a gas generator system according to the present invention.
Figure 9:
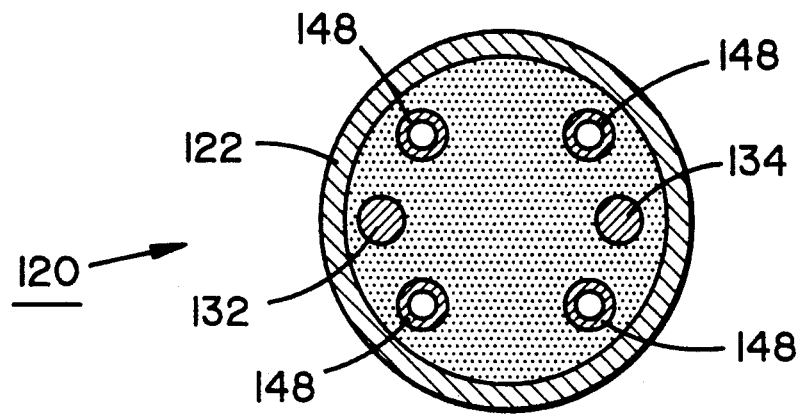
FIG. 9 is a cross-sectional view taken along line "9—9" of FIG. 8.
Figure 10:
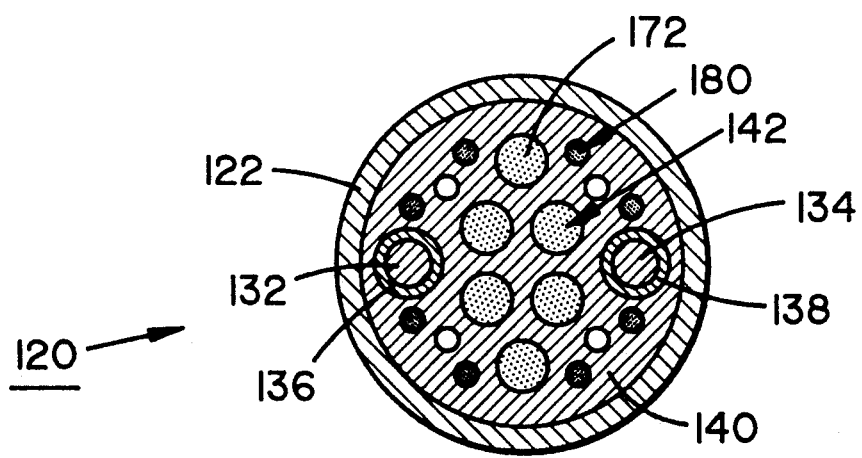
FIG. 10 is a cross-sectional view taken along line "10—10" of FIG. 8.
Figure 11:
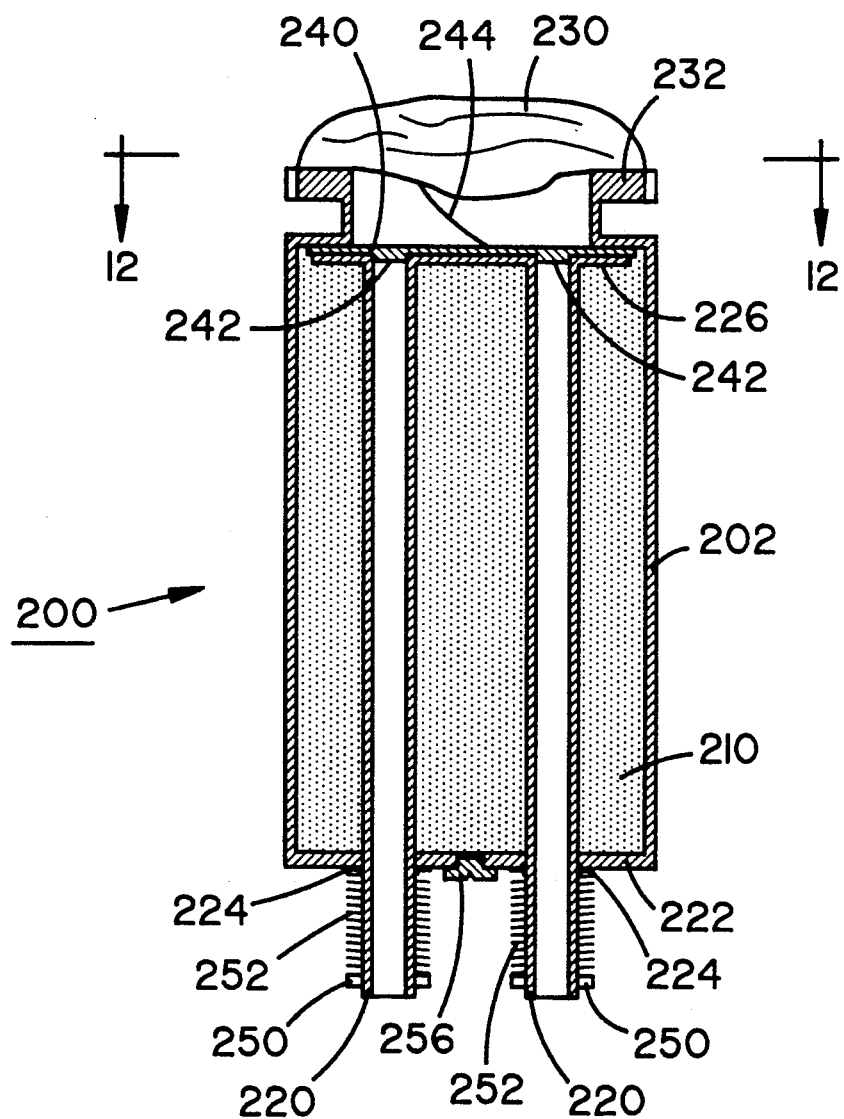
FIG. 11 is a side elevational view, in cross-section, of a further alternative embodiment of a gas generator system according to the present invention in an initial or deflated condition.
Figure 12:
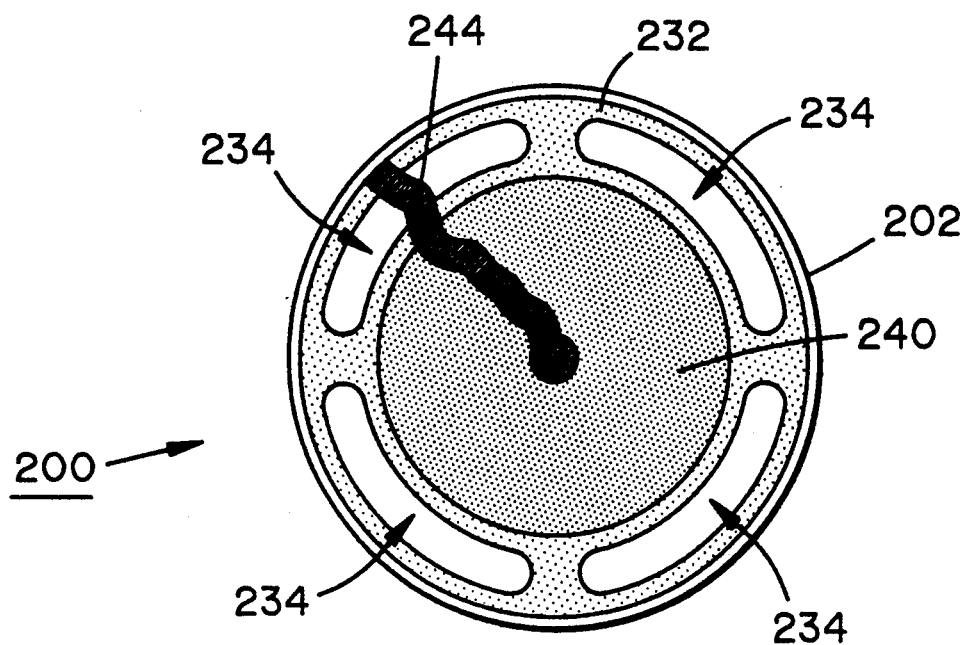
FIG. 12 is a cross-sectional view taken along line "12—12" of FIG. 11.
Figure 13:
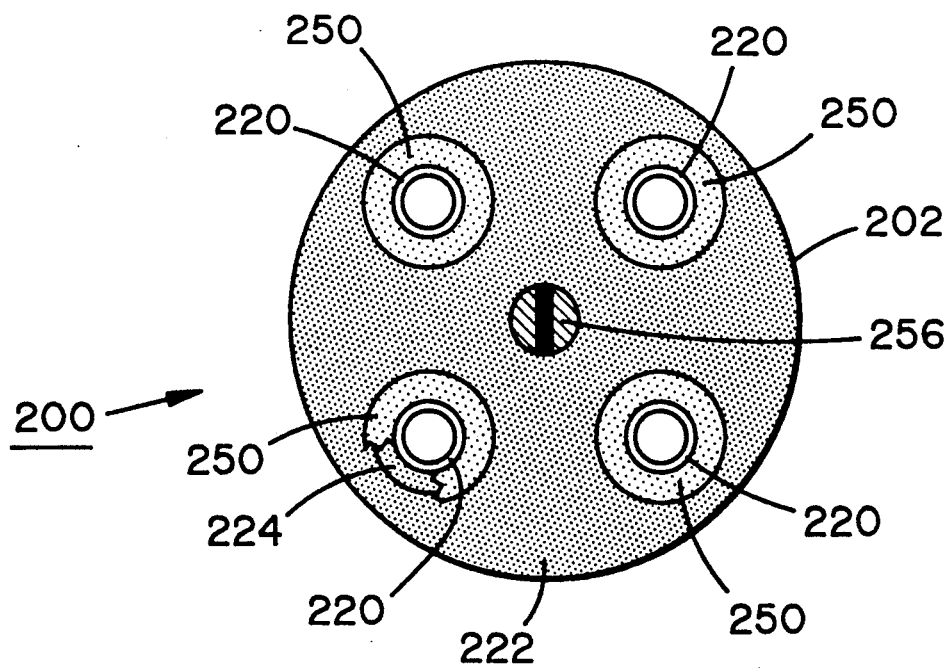
FIG. 13 is a bottom plan view, looking up, partially cut-away of the gas generator of FIG. 11.

An alternative embodiment of the present invention which overcomes the above limitation of system 20 is shown on FIGS. 8-10 which illustrate a gas generator system, generally indicated by the reference numeral 120. Elements common to system 20 shown on FIGS. 1-7 are given the same reference numerals with the addition of 100 thereto.

The construction and operation of system 120 are identical to that of system 20 described above, except that system 120 employs four, radially spaced and symmetrical with respect to spring guide posts 132 and 134, water inlet tubes 148, the distribution of apertures 142 in pressure plate 140 is different, and additional, symmetrically disposed apertures 180 have been added to the pressure plate. Each of inlet tubes 148 is smaller in diameter than inlet tube 48, but the total water inlet area has been more than doubled. It has been found that this arrangement provides a more even distribution of water to the surface of pressure plate 148, causing a cooler area of reaction along with minimizing the possibility of the formation of concentrated lithium hydroxide.

As shown on FIG. 10, six larger apertures 142 are symmetrically disposed through pressure plate 140, with respect to spring guide posts 132 and 134, and each inlet tube 148 has two closely and symmetrically spaced smaller apertures 180, the total area of all the apertures being approximately 34 percent of the area of pressure plate 140.

FIGS. 11-14 illustrate a further embodiment of a gas generator system according to the present invention, generally indicated by the reference numeral 200. System incorporates the improved water inlet distribution feature of system 120 described above and operates essentially the same as systems 20 and 120 described above, but system 200 has been designed to be stored in an inverted position, to improve manufacturability and minimize assembly time, and to increase packaging density.

System 200 includes a open top cylindrical housing 202 substantially filled in its initial condition (FIG. 11) with a water reactive chemical 210. Four open, vertical water inlet tubes 220 slidingly extend through bottom 222 of housing 202, with seals 224 (FIG. 13) disposed between the inlet tubes and the bottom. The tops of inlet tubes 220 are fixedly attached to a horizontal, perforated pressure plate 226 disposed, in the initial condition (FIG. 11) at the top of housing 202 and extending thereacross. A float 230 is fixedly attached to an annular float mount 232 which is, in turn, fixedly attached to the top of housing 202. Four upper vents 234 (FIG. 12) are defined through float mount 232 for communication between the lower portion of float 230 and an open annular space underneath the float mount.

A layer of closed cell foam 240 is disposed, with slight compression, between the upper surface of pressure plate 226 and the lower surface of annular float mount 232, with small extensions 242 into the tops of inlet tubes 220. An elongated float leash 244 is attached between the center of foam layer 240 and the interior wall of float 230.

Fixedly attached to the lower ends of inlet tubes 220 are four, horizontal, annular flanges 250. Compressed between flanges 250 and bottom 222 of housing 202 are four coil springs 252, such as to bias inlet tubes 220 and pressure plate 226 downwardly with respect to housing 202.

To fill housing 202 with chemical 210, foam layer 240 is placed on pressure plate 226 and inlet tubes 220 are forced into the housing to press the foam layer against the lower surface of annular float mount 232. Housing 202 is then inverted, a fill plug 256 in bottom 222 is removed, and the housing filled with chemical 210. Plug 256 is then replaced, with foam layer 240 retaining chemical 210 in housing 202, even when the housing is inverted.

Figure 14:
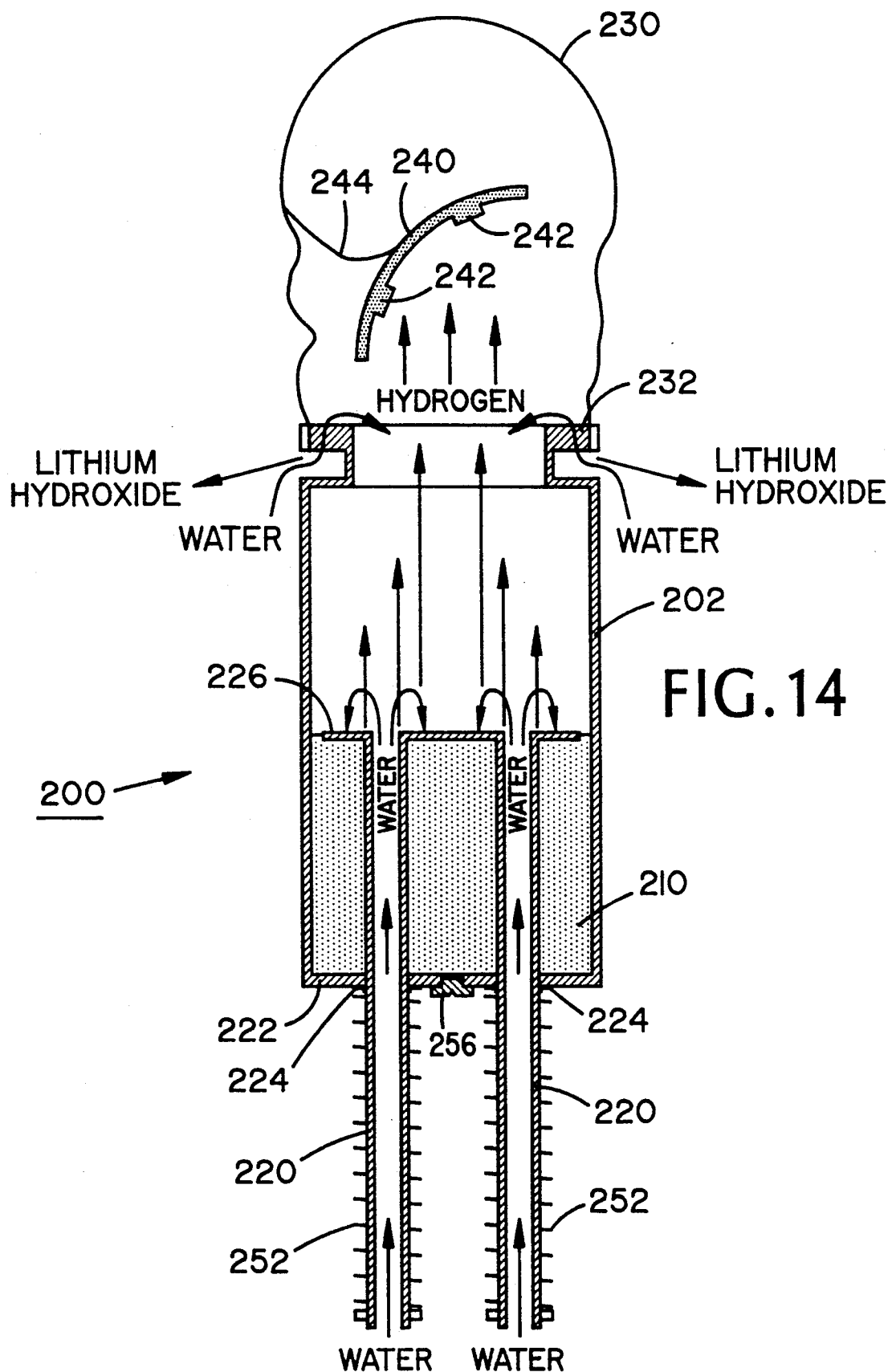
FIG. 14 is a side elevational view, in cross-section, of the gas generator of FIG. 11 in an intermediate inflated condition.

When system 200 is initially deployed, it is moving through the water. This motion causes float 230 to extend somewhat, putting tension on float leash 244 which pulls free foam layer 240, thus permitting the water entering system 200 access to chemical 210. FIG. 14 illustrates system 200 when float 230 is partially filled and chemical 210 has been partially consumed. Pressure plate 226 is forced downward by springs 252 to maintain contact with the upper surface of chemical 210 to control the rate of reaction, as described above. Upper vents 234 permit the exit of byproduct lithium hydroxide and also excess hydrogen.

If motion were not available to initiate activation, mechanical means, such as a spring (not shown), could be utilized to initially extend float 230 and remove foam layer 240 from the surface of pressure plate 226.

Systems 20, 120, and 200 may be constructed by conventional means of conventional materials suitable for the environments in which the systems are to be used.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A gas generator system for providing underwater buoyancy, comprising:
   (a) a housing for placement therein of a solid chemical to produce a gas upon reaction of said solid chemical with water, said solid chemical having an upper surface;
   (b) inlet means in said housing to bring said water in contact with solid chemical in said housing;
   (c) float means, having a lower end, attached to an upper portion of said housing to receive said gas and thereby to become inflated so as to provide buoyancy for said housing;
   (d) a pressure plate disposed in said housing to continually bear against said upper surface of said solid chemical as said solid chemical is consumed by said reaction, said pressure plate having defined therethrough a plurality of apertures, the total area of said apertures being selected so as to control the rate of said reaction of said solid chemical and being spaced so as to permit even distribution of water to the surface of said solid chemical; and
   (e) biasing means contacting said pressure plate to cause said pressure plate to continually bear against said upper surface of said solid chemical as said solid chemical is consumed.

2. A gas generator system, as defined in claim 1, wherein said total area of said apertures is such that said rate of reaction will generate gas at a rate sufficient to flush byproduct reaction materials from said upper surface of said chemical.

3. A gas generator system, as defined in claim 1, wherein said total area of said apertures is approximately 20 to 40 percent of the area of said pressure plate.

4. A gas generator system, as defined in claim 2, wherein said pressure plate has upper and lower surfaces and is horizontal, with said lower surface thereof contacting said chemical and said inlet means comprises at least one hollow, vertical tube having a lower end in contact with the water in which said system is deployed and an upper end terminating at said upper surface of said pressure plate.

5. A gas generator system, as defined in claim 4, wherein said inlet means additionally comprises at least one upper vent defined through said housing above said pressure plate, said at least one upper vent comprising a downwardly opening tube extending outwardly from said housing.

6. A gas generator system, as defined in claim 5, wherein said at least one upper vent is arranged for the exit therethrough of byproduct reaction materials.

7. A gas generator system, as defined in claim 1, further comprising an open gas vent defined at the lower end of said float means for egress of excess gas.

8. A gas generator system, as defined in claim 1, further comprising a hydride disposed in said housing as said solid chemical.

9. A gas generator system, as defined in claim 8, wherein said hydride is lithium hydride.

10. A gas generator system for providing underwater buoyancy, comprising:
    (a) a vertical, open top, closed bottom, housing for placement in a lower portion thereof a solid chemical to produce a gas upon reaction of said solid chemical with water, said chemical having an upper surface;
    (b) float means attached to an upper portion of said housing to receive said gas and thereby to become inflated so as to effect said buoyancy;
    (c) a horizontal pressure plate, disposed in said housing, extending across said housing and axially moveable with respect thereto, said pressure plate to continually bear against said upper surface of said solid chemical as said solid chemical is consumed by said reaction, and said pressure plate have defined therethrough a plurality of apertures, the total area of said apertures being selected so as to control the rate of said reaction of said solid chemical and being spaced so as to permit even distribution of water to the surface of said solid chemical;
    (d) biasing means causing said pressure plate to continually bear against said upper surface of said solid chemical as said solid chemical is consumed; and
    (e) at least one vertical, hollow, water inlet tube, having upper and lower ends, to bring said water in contact with said solid chemical, said upper end of said at least one vertical, hollow, water inlet tube being fixedly attached to said pressure plate so as to discharge water to an upper surface of said pressure plate and said lower end of said at least one vertical, hollow, water inlet tube extending through said closed bottom of said housing so as to permit drawing thereinto of water in which said system is deployed, said water being drawn into said at least one vertical, hollow water inlet tube by means of a chimney effect of said gas rising from said upper surface of said solid chemical as said gas is generated.

11. A gas generator system, as defined in claim 10, wherein said biasing means comprises:
    (a) at least one horizontal spring guide support plate disposed across said housing and fixedly attached thereto above said pressure plate;
    (b) at least one spring guide fixedly attached to said spring guide support plate and depending therefrom and extending through said pressure plate for sliding movement relative thereto; and
    (c) a coil spring disposed around said spring guide and compressed between said spring guide support plate and said pressure plate.

12. A gas generator system, as defined in claim 10, wherein said biasing means comprises:
    (a) a horizontal annular flange fixedly attached to said at least one vertical, hollow, water inlet tube at said lower end thereof below said closed bottom of said housing; and
    (b) a coil spring disposed around said at least one inlet tube and compressed between said horizontal annular flange and said closed bottom of said housing.

13. A gas generator system, as defined in claim 10, wherein said total area of said aperture is such that said rate of reaction will generate gas at a rate sufficient to flush byproduct reaction materials from upper said upper surface of said solid chemical.

14. A gas generator system, as defined in claim 10, wherein said total area of said apertures is approximately 20 to 40 percent of the area of said pressure plate.

15. A gas generator system, as defined in claim 10, further comprising: at least one upper vent defined through said housing above said pressure plate, said at least one vent comprising a downwardly opening tube extending outwardly from said housing.

16. A gas generator system, as defined in claim 15, wherein the elements of said system are arranged such that said byproduct reaction materials will exit through said upper vent.

17. A gas generator system, as defined in claim 10, further comprising an open gas vent defined at the lower end of said float means for the egress of the excess gas.

18. A gas generator system, as defined in claim 10, further comprising a layer of flexible material to be captured between said upper surface of said pressure plate and an upper portion of said housing so as to retain said solid chemical in place if said housing is inverted.

19. A gas generator system, as defined in claim 18, further comprising a leash attached between said layer of flexible material and said float means such that initial movement of said float means will pull said layer of flexible material from said upper surface of said pressure plate.

* * * * *